United States Patent
Nomura (10) Patent No.: US 11,778,109 B2
(45) Date of Patent: Oct. 3, 2023

(54) DISPLAY APPARATUS THAT CAUSES DISPLAY DEVICE TO ENLARGE OR REDUCE IMAGE ACCORDING TO USER GESTURE DETECTION RESULT FROM DETECTOR, AND IMAGE FORMING APPARATUS

(71) Applicant: KYOCERA Document Solutions Inc., Osaka (JP)

(72) Inventor: Kazuma Nomura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 44 days.

(21) Appl. No.: 17/685,783

(22) Filed: Mar. 3, 2022

(65) Prior Publication Data
US 2022/0311884 A1 Sep. 29, 2022

(30) Foreign Application Priority Data
Mar. 29, 2021 (JP) .................... 2021-055933

(51) Int. Cl.
*H04N 1/00* (2006.01)
*G06F 3/01* (2006.01)

(52) U.S. Cl.
CPC ..... *H04N 1/00381* (2013.01); *H04N 1/00469* (2013.01); *G06F 3/017* (2013.01)

(58) Field of Classification Search
CPC . H04N 1/00469; H04N 1/00381; G06F 3/017
See application file for complete search history.

(56) References Cited

U.S. PATENT DOCUMENTS

| | | | | |
|---|---|---|---|---|
| 2012/0311503 A1* | 12/2012 | Preston | .................. | G06F 3/012 715/850 |
| 2015/0138070 A1* | 5/2015 | Iwatsu | .................... | G06F 3/011 345/156 |
| 2016/0062636 A1* | 3/2016 | Jung | .................. | G06F 3/04817 715/762 |
| 2016/0147294 A1* | 5/2016 | Bae | ........................ | G06F 3/017 345/156 |
| 2016/0306431 A1* | 10/2016 | Stafford | .............. | G02B 27/017 |

FOREIGN PATENT DOCUMENTS

| | | |
|---|---|---|
| JP | H0887380 A | 4/1996 |
| JP | 2012226691 A | 11/2012 |

* cited by examiner

*Primary Examiner* — Benjamin C Lee
*Assistant Examiner* — Nathan P Brittingham
(74) *Attorney, Agent, or Firm* — IP BUSINESS SOLUTIONS, LLC (57) ABSTRACT

A display apparatus includes a display device, a detection device, and a control device that acts as a controller. The controller displays a predetermined image on the display device, calculates, upon detecting a loop and a user's eye inside the loop through the detection device, a relative size of the user's eye with respect to the loop, as a reference size, causes the display device, upon detecting through the detection device that the relative size has changed to a size larger than the reference size, to enlarge the predetermined image, in proportion to a difference between the relative size and the reference size, and causes the display device, upon detecting through the detection device that the relative size has changed to a size smaller than the reference size, to reduce the predetermined image, in proportion to a difference between the relative size and the reference size.

5 Claims, 9 Drawing Sheets

DISPLAY APPARATUS THAT CAUSES DISPLAY DEVICE TO ENLARGE OR REDUCE IMAGE ACCORDING TO USER GESTURE DETECTION RESULT FROM DETECTOR, AND IMAGE FORMING APPARATUS

INCORPORATION BY REFERENCE

This application claims priority to Japanese Patent Application No. 2021-055933 filed on 29 Mar. 2021, the entire contents of which are incorporated by reference herein.

BACKGROUND

The present disclosure relates to a display apparatus and an image forming apparatus, and in particular to a technique to enlarge or reduce a displayed image.

Techniques to enlarge a displayed image are generally known. For example, a first technique includes enlarging a part of the displayed image, when the size of the finger of an operator, who has pressed a specific switch on an operation panel, is larger than a predetermined threshold.

In addition, a second technique includes enlarging a display of an icon pointed by a fingertip, when a residence time of the fingertip detected through a proximate operation is equal to or longer than a predetermined threshold, but keeping the size of the icon unchanged, when the residence time is shorter than the predetermined threshold.

SUMMARY

The disclosure proposes further improvement of the foregoing techniques.

In an aspect, the disclosure provides a display apparatus including a display device, a detection device, and a control device. The detection device detects a gesture of a user. The control device includes a processor, and acts as a controller when the processor executes a control program. The controller causes the display device to display a predetermined image in a display region, calculates, upon detecting a predetermined loop shape and a user's eye located inside the loop shape, according to a detection result from the detection device, a relative size of the user's eye with respect to a size of the loop shape at a time of the detection, as a reference size, causes the display device, when the controller detects that the relative size has changed, according to the detection result from the detection device, and when the changed relative size is larger than the reference size, to enlarge the predetermined image, in proportion to a difference between the changed relative size and the reference size, and causes the display device, when the controller detects that the relative size has changed, according to the detection result from the detection device, and when the changed relative size is smaller than the reference size, to reduce the predetermined image, in proportion to a difference between the changed relative size and the reference size.

In another aspect, the disclosure provides an image forming apparatus including the foregoing display apparatus, and an image forming device. The image forming device forms an image on a recording medium.

DETAILED DESCRIPTION

Figure 1:
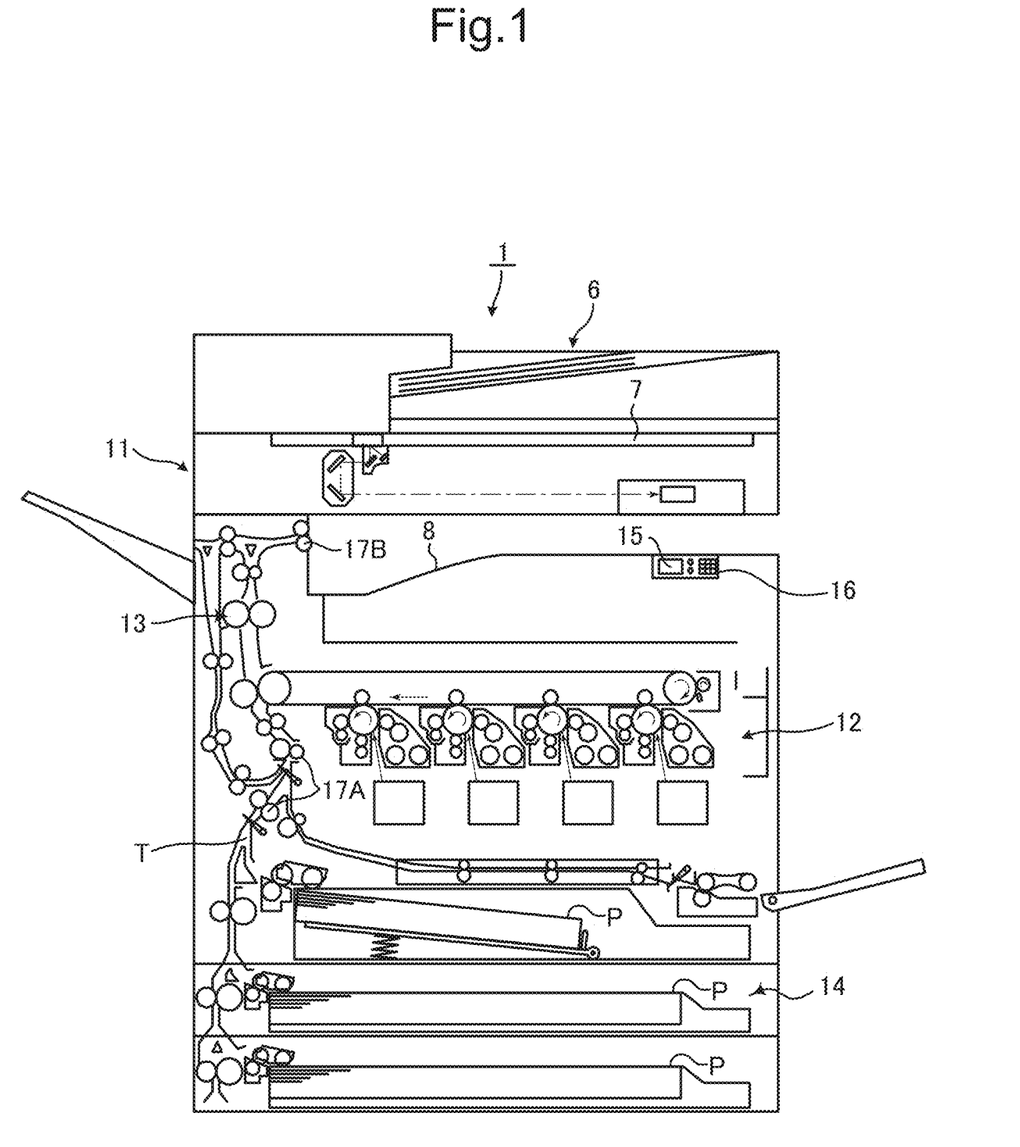
FIG. 1 is a front cross-sectional view showing a structure of an image forming apparatus according to an embodiment of the disclosure.
Figure 2:
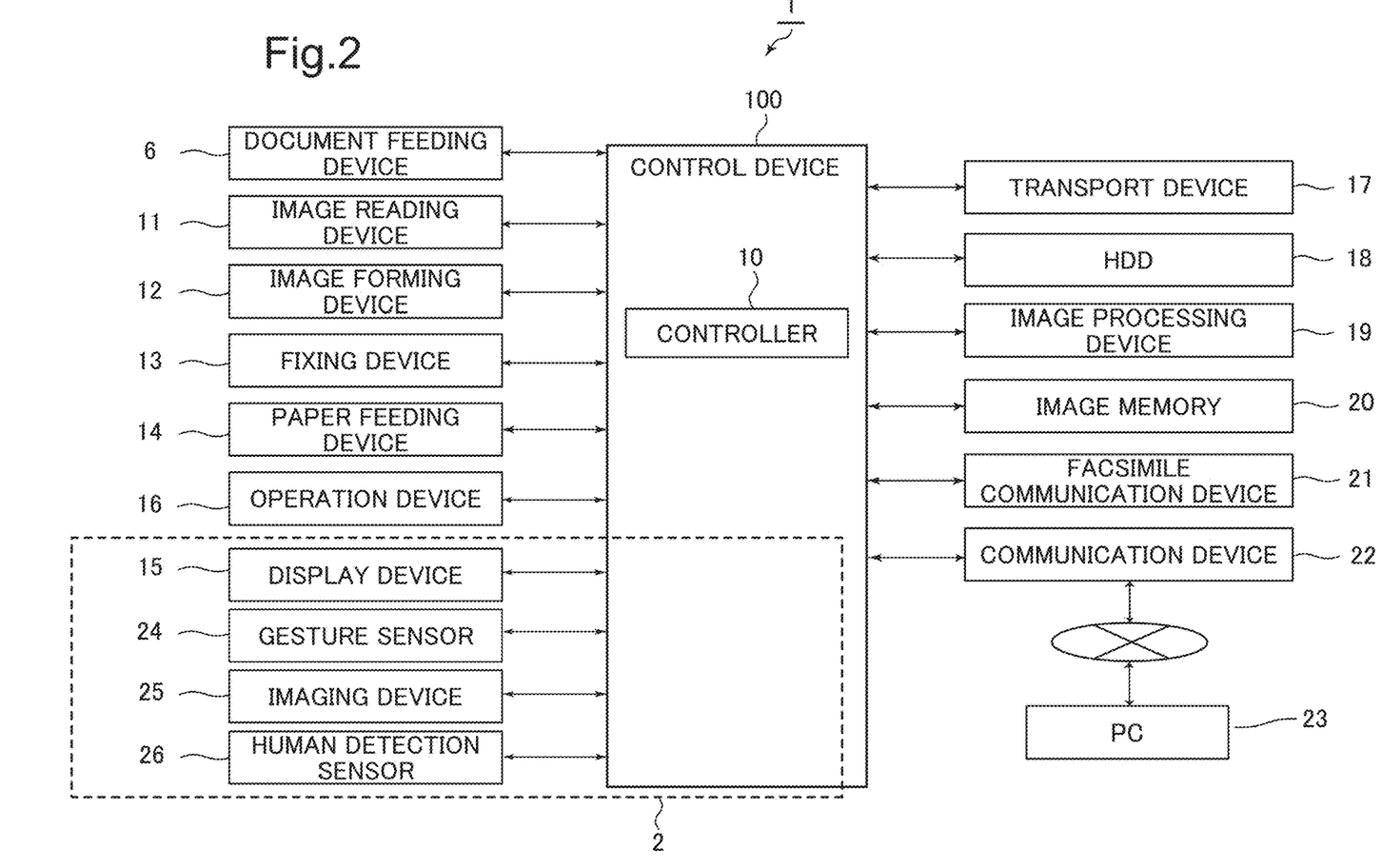
FIG. 2 is a block diagram showing an internal configuration of the image forming apparatus.

Hereafter, an image forming apparatus including a display apparatus according to an embodiment of the disclosure will be described, with reference to the drawings. FIG. 1 is a front cross-sectional view showing a structure of the image forming apparatus according to the embodiment of the disclosure. FIG. 2 is a block diagram showing an internal configuration of the image forming apparatus.

Referring to FIG. 1 and FIG. 2, the image forming apparatus 1 is a multifunction peripheral having a plurality of functions, such as copying, transmitting, printing, and facsimile transmission. In the casing of the image forming apparatus 1, a plurality of components for realizing various functions of the image forming apparatus 1 are provided. For example, an image reading device 11, an image forming device 12, a fixing device 13, a paper feeding device 14, and so forth are provided inside the casing.

The image forming apparatus 1 includes a control device 100. The control device 100 includes a processor, a random-access memory (RAM), a read-only memory (ROM), and so forth. The processor is, for example, a central processing unit (CPU), a micro processing unit (MPU), or an application specific integrated circuit (ASIC).

The control device 100 acts as a controller 10, when the processor operates executes a control program stored in the ROM or a HDD 18. The controller 10 serves to control the overall operation of the image forming apparatus 1. To be more detailed, the controller 10 controls the operation of each of the components of the image forming apparatus 1, and communication with a personal computer (PC) 23 connected via a network.

The controller 10 also performs a scaling operation according to a scaling program to be subsequently described. To be more detailed, upon detecting a predetermined loop shape formed by the user's hand, and the user's eye located inside the loop, the controller 10 calculates a relative size of the user's eye with respect to the size of the loop, as a reference size. Then the controller 10 causes the display device 15 to enlarge an operation screen, upon detecting that the relative size has changed to a size larger than the reference size, and causes the display device 15 to reduce the operation screen, upon detecting that the relative size has changed to a size smaller than the reference size. Here, the controller 10 may be constituted of a logic circuit, instead of being realized by the operation according to the control program.

The control device 100 is electrically connected to a document feeding device 6, the image reading device 11, the image forming device 12, the fixing device 13, the paper feeding device 14, the display device 15, an operation device 16, a transport device 17, the HDD 18, an image processing device 19, an image memory 20, a facsimile communication device 21, a communication device 22, a gesture sensor 24, an imaging device 25, and a human detection sensor 26. The display device 15, the gesture sensor 24, the imaging device 25, the human detection sensor 26, and the control device 100 constitute the display apparatus 2.

The image reading device 11 is configured as an automatic document feeder (ADF) including the document feeding device 6 that delivers a source document placed on a document table, and a scanner that optically reads the source document, delivered from the document feeding device 6 or placed on a platen glass 7. The image reading device 11 reads the image of the source document, by emitting light from a light emitting device to the source document and receiving the reflected light with a charge-coupled device (CCD) sensor, and generates image data representing the source image.

The image forming device 12 includes a photoconductor drum, a charging device, an exposure device, a development device, and a transfer device. The image forming device 12 forms an image constituted of a toner image on a recording sheet P, transported by the transport device 17 along a transport route T, on the basis of the image data generated by the document reading device 11, or image data inputted through the communication device 22.

The fixing device 13 heats and presses the recording sheet P on which the toner image has been formed by the image forming device 12, to thereby fix the toner image onto the recording sheet. The recording sheet P on which the toner image has been fixed by the fixing device 13 is delivered to an output tray 8.

The paper feeding device 14 includes a manual bypass tray, and a plurality of paper cassettes. The paper feeding device 14 draws out the recording sheets P stored in one of the plurality of paper cassettes, or the recording sheets placed on the manual bypass tray, one by one with a pickup roller, and delivers the recording sheet to the transport route T.

The display device 15 is, for example, constituted of an LCD or an organic light-emitting diode (OLED) display. The display device 15 displays, under the control of the controller 10, various types of screen related to the functions that the image forming apparatus 1 is configured to perform, in the display region.

The operation device 16 is provided on the front side of the image forming apparatus 1. The operation device 16 includes a plurality of hard keys, such as a start key for instructing the start of a desired function. The operation device 16 also includes a touch panel overlaid on the display region of the display device 15. The user can input, through the operation device 16, various types of information, including instructions related to the functions that the image forming apparatus 1 is configured to perform.

The transport device 17 includes a transport roller pair 17A, a delivery roller pair 17B, and a transport motor connected to the transport roller pair 17A and the delivery roller pair 17B. The controller 10 drives the transport motor so as to rotate the transport roller pair 17A and the delivery roller pair 17B, thereby transporting the recording sheet P delivered from the paper feeding device 14 along the transport route T, toward the image forming device 12 and then to an output tray 8.

The HDD 18 is a large-capacity storage device for storing various types of data, such as the image data generated by the image reading device 11. The HDD 18 contains control programs for realizing the functions of the image forming apparatus 1. As an example of the various programs, the HDD 18 contains the scaling program for executing the scaling operation according to the embodiment of the disclosure.

The image processing device 19 executes, as necessary, the image processing to the image data generated by the image reading device 11. The image memory 20 includes a region for temporarily storing the image data generated by the image reading device 11. The facsimile communication device 21 makes connection to the public telephone line, and transmits and receives the image data via the public telephone line.

The communication device 22 includes a communication module such as a local area network (LAN) board. The image forming apparatus 1 performs data communication through the communication device 22, for example with the PC 23 connected via a network.

The gesture sensor 24 is provided in the operation device 16. The detection region of the gesture sensor 24 extends in a direction perpendicular to the display region of the display device 15. A known sensor may be employed as the gesture sensor, provided that the sensor is capable of detecting the shape of the user's hand. For example, an infrared camera may be employed.

The imaging device 25 is a digital camera including an image sensor and lenses. The imaging device 25 is provided in the operation device 16. The imaging device 25 shoots the user in the detection region of the gesture sensor 24, at predetermined time intervals, and generates a plurality of pieces of image data representing the shot image (hereinafter, simply "shot image").

The controller 10 detects a gesture formed of the user's hand and the user's eye, on the basis of the detection result from the gesture sensor 24 and the shooting result from the imaging device 25. The controller 10, the gesture sensor 24, and the imaging device 25 constitute the detection device in the disclosure.

The human detection sensor 26 is provided on the front side of the image forming apparatus 1. The human detection sensor 26 detects a person located in a predetermined region in the proximity of the image forming apparatus 1. The type of the human detection sensor 26 is not specifically limited. For example, an infrared camera may be employed.

In this embodiment, the controller 10 can set, according to the instruction from the user, one of a contact mode for inputting an instruction based on a touch on the hard key of the operation device 16 or on the touch panel, and a non-contact mode for inputting an instruction based on the gesture detected by the gesture sensor 24. In the case of the non-contact mode, for example when the gesture sensor 24 detects the user's gesture of bringing the finger close to the operation screen displayed on the display device 15, the controller 10 receives an instruction corresponding to a key image identified according to the position of the user's finger.

A power source is provided for each of the components of the image forming apparatus 1, so that those components are activated with the power supplied from the power source.

[Operation of Image Forming Apparatus 1]

Figure 3:
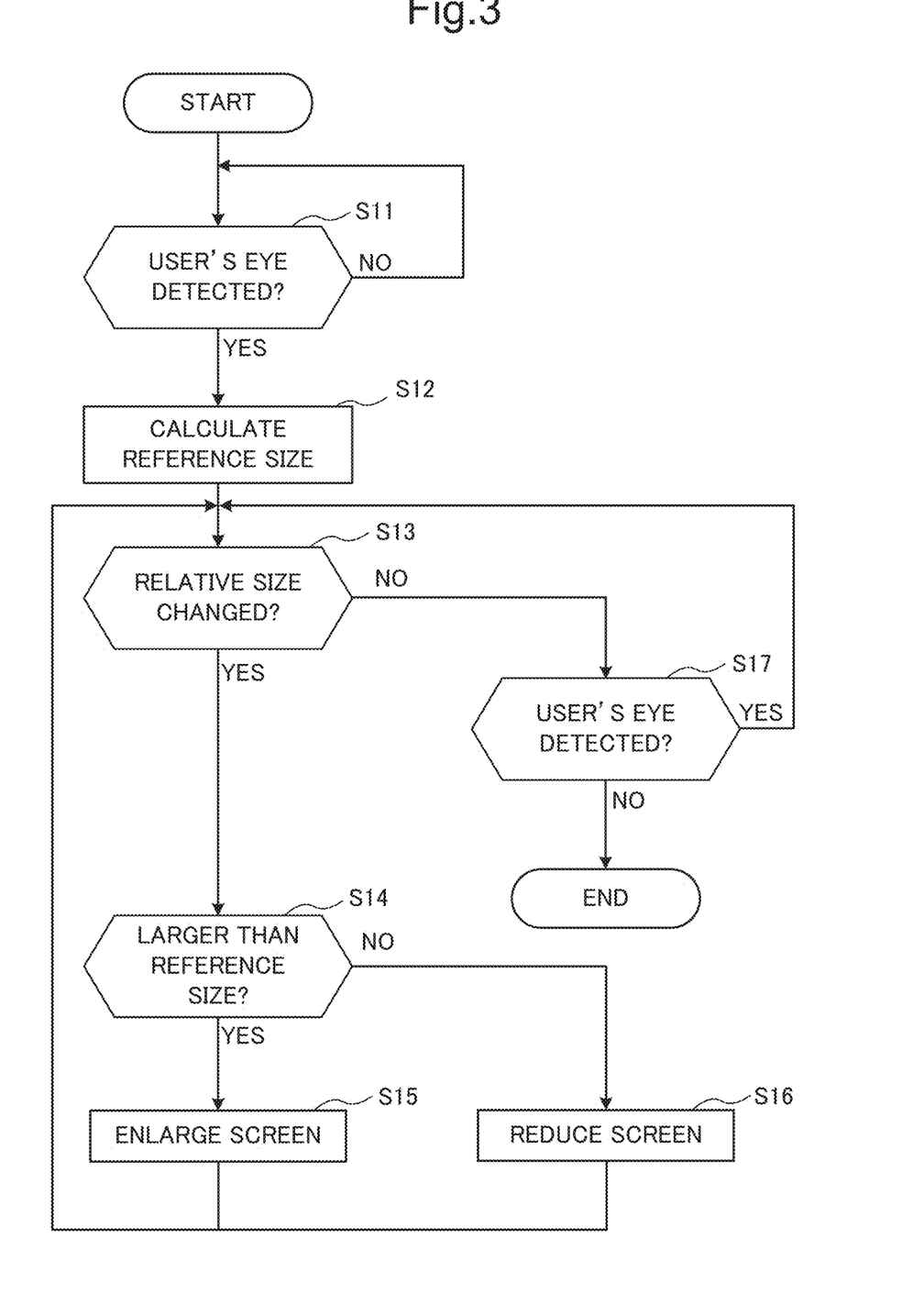
FIG. 3 is a flowchart showing an enlarging/reducing operation.
Figure 4:
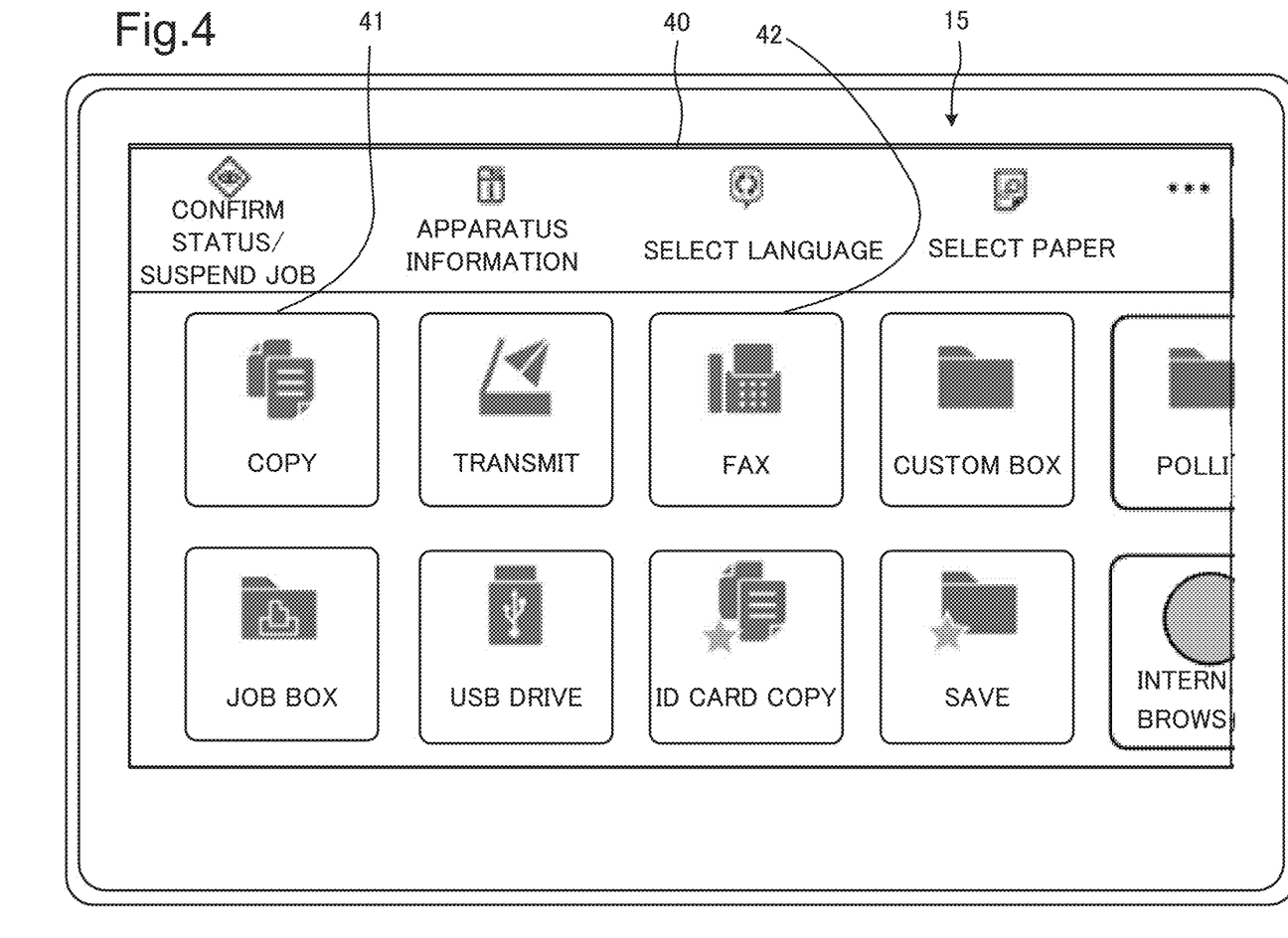
FIG. 4 is a schematic drawing showing an example of a home screen.
Figure 5:
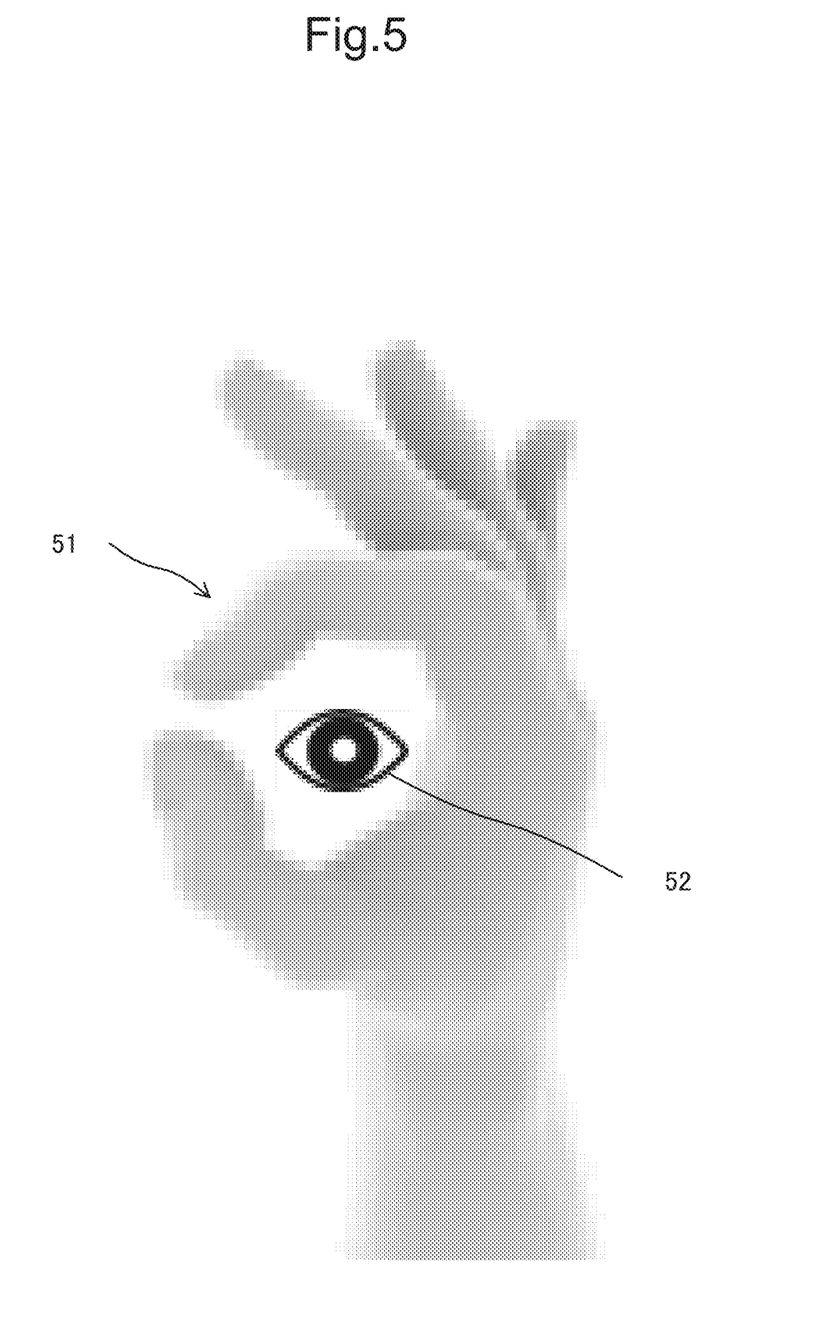
FIG. 5 is a schematic drawing showing an example of a user's gesture.
Figure 6:
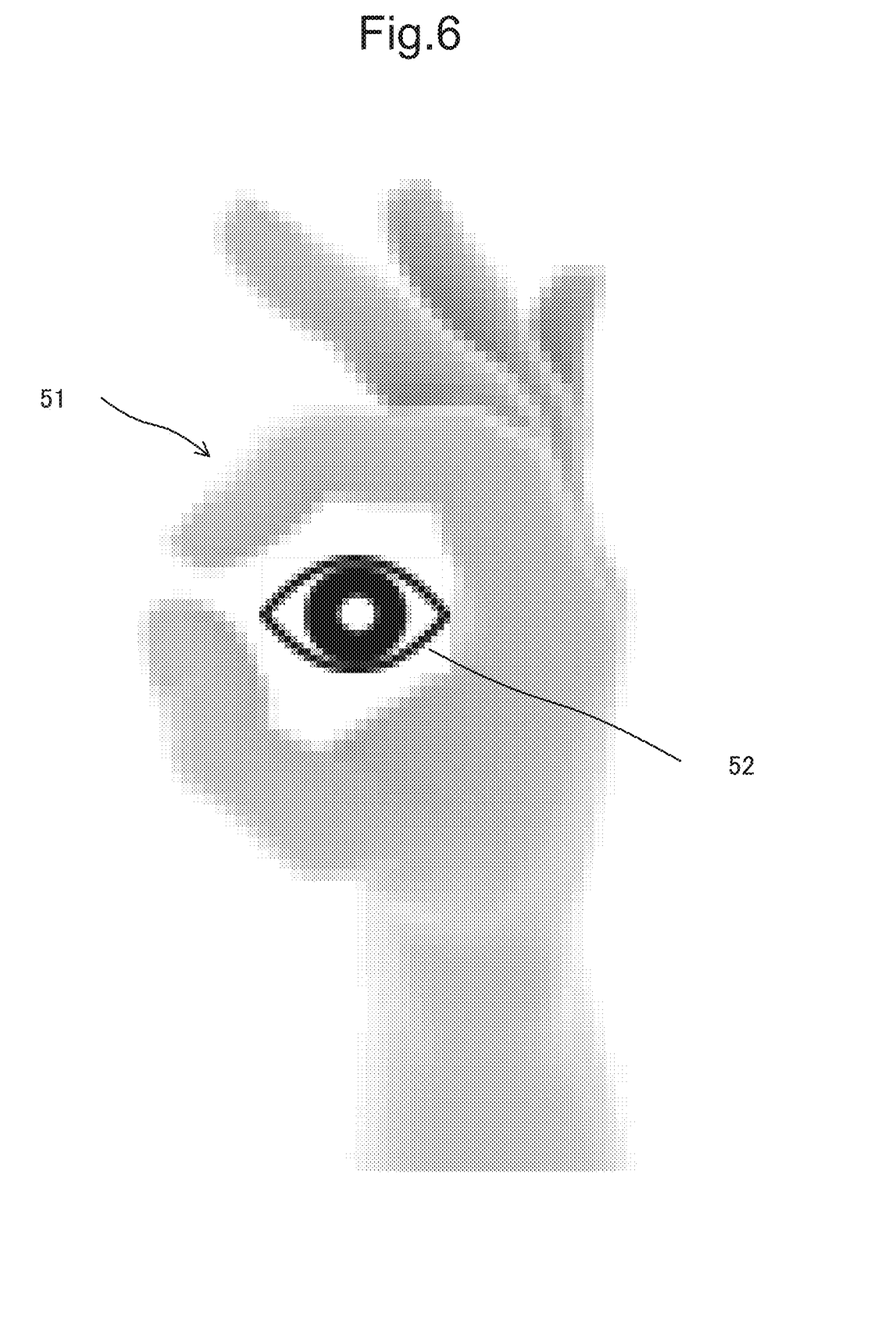
FIG. 6 is a schematic drawing showing another example of the user's gesture.
Figure 7:
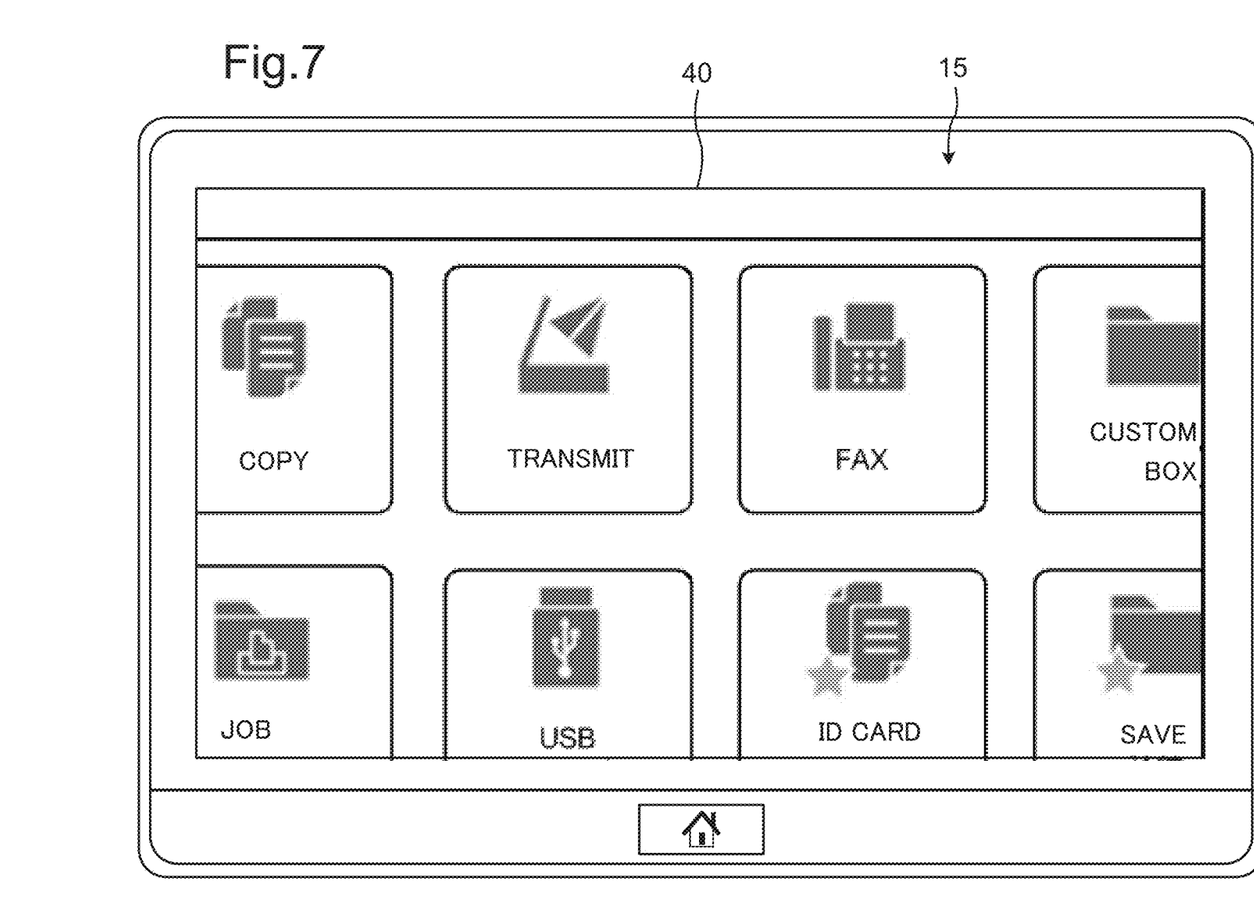
FIG. 7 is a schematic drawing showing the home screen in the enlarged state.
Figure 8:
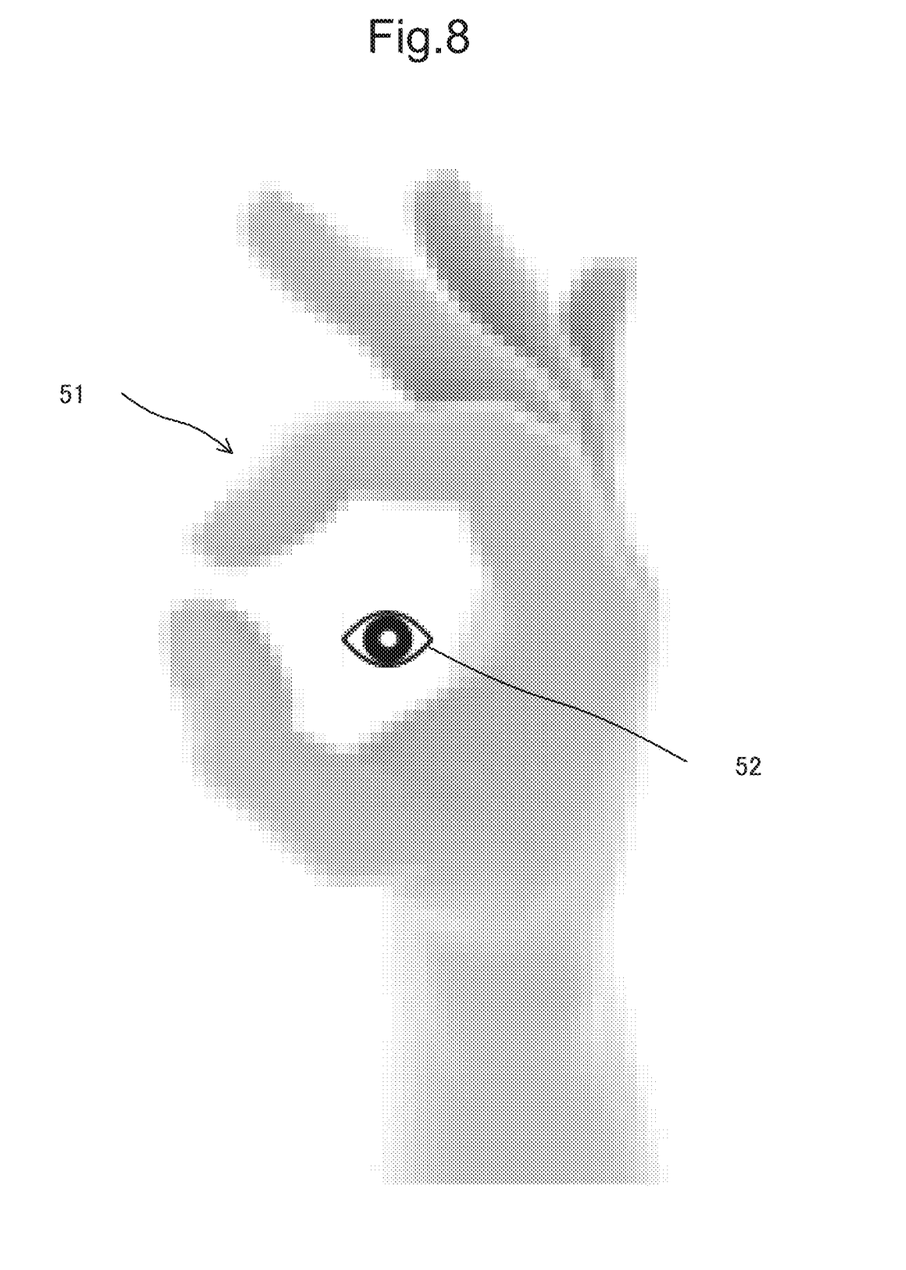
FIG. 8 is a schematic drawing showing another example of the user's gesture.
Figure 9:
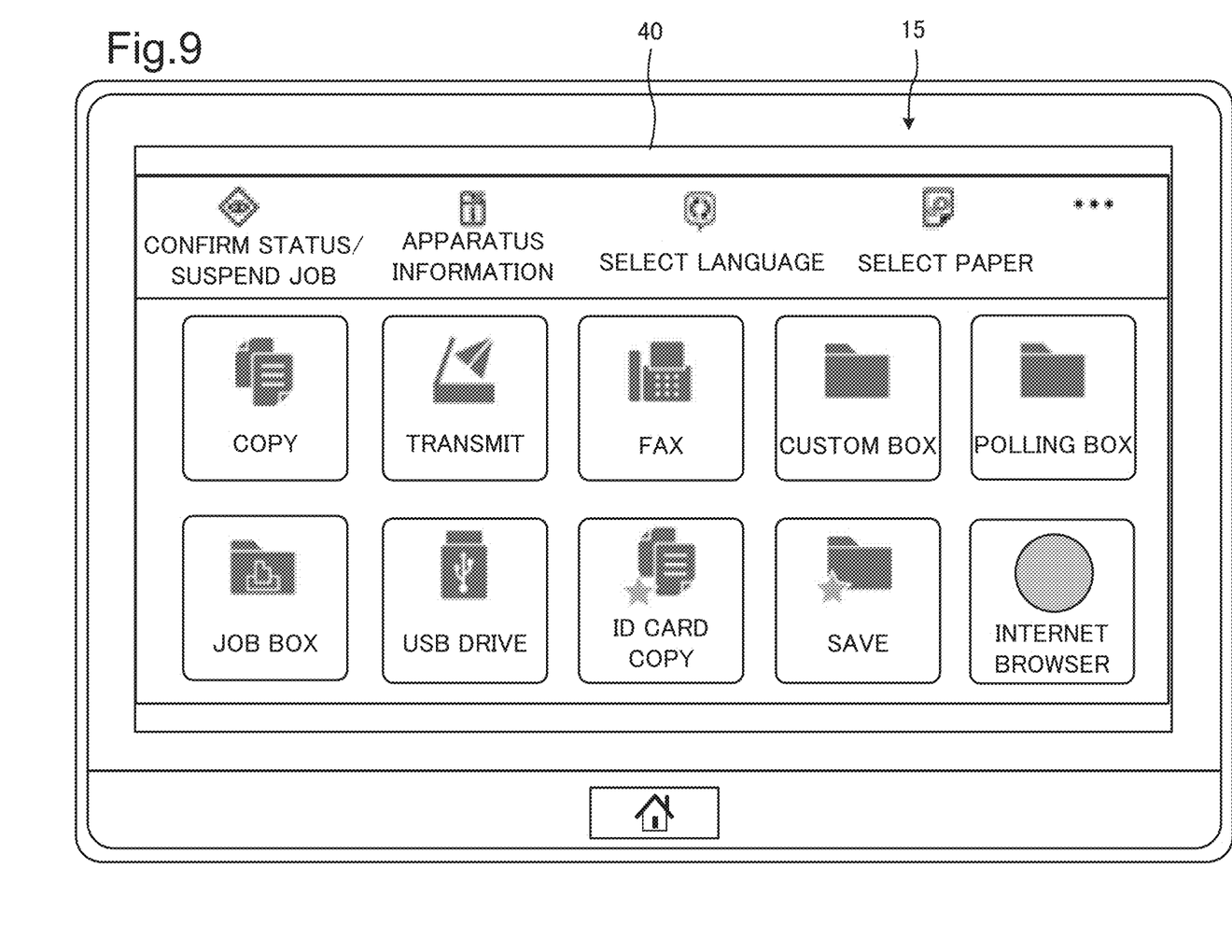
FIG. 9 is a schematic drawing showing the home screen in the reduced state.

FIG. 3 is a flowchart showing an enlarging/reducing operation. FIG. 4 illustrates an example of a home screen. FIG. 5 illustrates an example of a user's gesture. FIG. 6 illustrates another example of the user's gesture. FIG. 7 illustrates the home screen in the enlarged state. FIG. 8 illustrates another example of the user's gesture. FIG. 9 illustrates the home screen in the reduced state.

Referring to FIG. 3 to FIG. 9, the scaling operation performed by the image forming apparatus 1 will be described hereunder.

First, the user turns on the power to the image forming apparatus 1. When the power to the image forming apparatus 1 is turned on, the controller 10 causes the display device 15 to display a home screen 40 shown in FIG. 4, which serves as an operation screen, in the display region. In this case, the entirety of the home screen 40 is unable to be displayed in the display region, and therefore the controller 10 causes the display device 15 to display a part of the home screen 40 in the display region.

The controller 10 causes the display device 15 to display a plurality of key images, respectively corresponding to different instructions, on the home screen 40. In the example shown in FIG. 4, the controller 10 causes the display device 15 to display a key image 41 for inputting the instruction to select the copying function, a key image 42 for inputting the instruction to select the facsimile function, and so forth, on the home screen 40.

When the user comes close to the front side of the image forming apparatus 1 in the mentioned state, the human detection sensor 26 detects the presence of the user in the predetermined detection region. Then the controller 10 causes the gesture sensor 24 to detect the shape of the user's hand, until the human detection sensor 26 stops detecting the user, and causes the imaging device 24 to shoot the user in the detection region at predetermined time intervals, to thereby generate a plurality of shot images.

Then the user forms a loop shape 51 as shown in FIG. 5, using the thumb and the index finger of the right hand, in the detection region of the gesture sensor 24. When the gesture sensor 24 detects the loop shape 51, exemplifying the predetermined loop shape in the disclosure, the controller 10 starts the scaling operation specified in FIG. 3. Upon starting the scaling operation, the controller 10 repeats deciding that the user's eye has not been detected (NO at step S11), until detecting the image representing the user's eye located inside the image representing the detected loop shape, on the basis of the plurality of shot images generated as above.

The user then moves the face, so as to bring the right eye 52 into inside the loop shape 51. The controller 10 analyzes the plurality of shot images, and detects the image representing the user's eye (in this case, right eye 52) located inside the image representing the detected loop shape (in this case, loop shape 51) (YES at step S11). The controller 10 then calculates a relative size of the image representing the user's eye, with respect to the size of the image representing the loop shape at the time that the user's eye has been detected (hereinafter, simply "relative size"), as a reference size (step S12).

Although the calculation method of the relative size is not specifically limited, the controller 10 may calculate, for example, a ratio in area of the region surrounded by the contour line of the image representing the right eye 52, to the region surrounded by the contour line of the image representing the loop shape 51, as the relative size. Alternatively, the controller 10 may calculate a ratio of the width (distance between the inner and outer corners) of the right eye 52, to the diameter of the image representing the loop shape 51, as the relative size.

After step S12, the controller 10 sequentially calculates the relative size in the order that the images have been shot, on the basis of the plurality of shot images, and decides whether the calculated relative size has changed (step S13).

(1) When Relative Size is Larger than Reference Size

Here, it will be assumed that the user has brought the right eye 52 to a position closer to the loop shape 51, from the position shown in FIG. 5. Accordingly, as shown in FIG. 6, the relative size of the image representing the right eye 52 becomes larger with respect to the image representing the loop shape 51, compared with the state shown in FIG. 5, and the controller 10 calculates the relative size of a value larger than the reference size, on the basis of the shot image acquired at this point.

In this case, the controller 10 decides that the relative size has changed (YES at step S13), and that the relative size after the change is larger than the reference size (YES at step S14), and causes the display device 15 to enlarge the home screen 40, in proportion to the difference between the relative size and the reference size, as shown in FIG. 7 (step S15). After step S15, the operation of the controller 10 returns to step S13.

(2) When Relative Size is Smaller than Reference Size

It is now assumed that the user has brought the right eye 52 to a position farther from the loop shape 51, from the position shown in FIG. 5. Accordingly, as shown in FIG. 8, the relative size of the image representing the right eye 52 becomes smaller with respect to the image representing the loop shape 51, compared with the state shown in FIG. 5, and the controller 10 calculates the relative size of a value smaller than the reference size, on the basis of the shot image acquired at this point.

In this case, the controller 10 decides that the relative size has changed (YES at step S13), and that the relative size after the change is not larger, in another word smaller, than the reference size (NO at step S14), and causes the display device 15 to reduce the home screen 40, in proportion to the difference between the relative size and the reference size, as shown in FIG. 9 (step S16). After step S16, the operation of the controller 10 returns to step S13.

In the case where the controller 10 decides at step S13 that the relative size has not changed (NO at step S13), the controller 10 decides, in the same way as step S11, whether the user's eye located inside the loop shape has been detected (step S17). In the case where the user is maintaining the posture shown in FIG. 5, FIG. 6, or FIG. 8, the controller 10 decides that the user's eye (right eye 52) located inside the detected loop shape (loop shape 51) has been detected, on the basis of the shot image (YES at step S17), and returns to step S13.

After the home screen 40 has been enlarged or reduced, the user moves the face away from the loop shape 51, and sets the thumb and the index finger to the initial position, thereby erasing the loop shape 51. In this case, since the relative size can no longer be calculated on the basis of the shot image, the controller 10 decides that the relative size has not changed (NO at step S13), and that the user's eye located inside the detected loop shape has not been detected (NO at step S17), and finishes the scaling operation.

Now, because of the pandemic spread of COVID-19, measures for infection prevention have to be taken, also with respect to apparatuses having a display device. With the first technique according to the Background Art, the scaling of the displayed image requires the touch operation, and therefore the risk of infection is unable to be eliminated. In the case of the second technique, although the scaling of the displayed image can be performed through a non-contact operation, the operation for the scaling is difficult to intuitively perceive.

According to the foregoing embodiment, in contrast, the controller 10 detects the loop shape 51 and the right eye 52 located inside the loop shape 51, on the basis of the detection result from the gesture sensor 24 and the plurality of shot images generated by the imaging device 25, and calculates the relative size at the time of the detection as the reference size. When the controller 10 detects that the relative size has changed, on the basis of the plurality of shot images, and when the changed relative size is larger than the reference size, the controller 10 causes the display device 15 to enlarge the home screen 40, in proportion to the difference between the changed relative size and the reference size. When the controller 10 detects that the relative size has changed, on the basis of the plurality of shot images, and when the changed relative size is smaller than the reference size, the controller 10 causes the display device 15 to reduce the home screen 40, in proportion to the difference between the changed relative size and the reference size.

Accordingly, the user can enlarge or reduce the home screen 40, by an intuitive non-contact operation (gesture) that looks like peeping through a hole, such as forming a loop shape with the fingers, and moving the eye toward or away from the loop shape. Therefore, the display apparatus provides high user-friendliness.

According to the foregoing embodiment, the controller 10 causes the display device 15 to display the home screen 40 including the plurality of key images 41, 42, and so forth, for inputting different instructions. Therefore, the user can easily input the intended instruction through the corresponding key image, by enlarging the home screen 40 by the intuitive non-contact operation.

According to the foregoing embodiment, the controller 10 causes the display device 15 to display a part of the home screen 40 in the display region. Therefore, the user can easily confirm visually, the remaining part of the home screen 40 not displayed in the display region at first, by reducing the home screen 40 by the intuitive non-contact operation.

According to the foregoing embodiment, further, the image forming apparatus 1 includes the display apparatus 2 and the image forming device 12. Therefore, the user can enlarge or reduce the operation screen for inputting the instruction to execute the image forming operation, by the intuitive non-contact operation. Consequently, the image forming apparatus provides high user-friendliness.

Other Variations

Although the operation screen is exemplified by the home screen 40 in the foregoing embodiment, the disclosure is not limited to such embodiment. For example, the operation screen may be a setup screen for inputting the settings for the copying function or the facsimile function.

Although it is assumed in the foregoing embodiment that the user forms the loop shape 51 with the thumb and the index finger, the disclosure is not limited to such embodiment. For example, the user may form the loop shape, using the thumb and the remaining four fingers.

The disclosure may be modified in various manners, without limitation to the configuration according to the foregoing embodiment. For example, although the image forming apparatus is exemplified by the image forming apparatus 1 which is a color multifunction peripheral in the embodiment, a different type of image forming apparatus, such as a monochrome multifunction peripheral, a copier, or a facsimile machine, may be employed.

Although the display apparatus is exemplified by the display apparatus 2 incorporated in the image forming apparatus 1 in the foregoing embodiment, a different type of display apparatus, such as a tablet terminal or a smartphone, may be employed.

Further, although the image forming device 12 is configured to form an image on the recording sheet P in the foregoing embodiment, the disclosure is not limited to such an embodiment. The image forming device 12 may form an image on a different type of recording medium, such as an overhead projector (OHP) sheet, without limitation to the recording sheet.

The configurations and processings according to the foregoing embodiments, described with reference to FIG. 1 to FIG. 9, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A display apparatus comprising:
  a display device;
  a detection device that detects a gesture of a user; and
  a control device including a processor, and configured to act, when the processor executes a control program, as a controller that:
    causes the display device to display a predetermined image in a display region;
    calculates, upon detecting a predetermined loop shape and a user's eye located inside the loop shape, according to a detection result from the detection device, a relative size of the user's eye with respect to a size of the loop shape at a time of the detection, as a reference size;
    causes the display device, when the controller detects that the relative size has changed, according to the detection result from the detection device, and when the changed relative size is larger than the reference size, to enlarge the predetermined image, in proportion to a difference between the changed relative size and the reference size; and
    causes the display device, when the controller detects that the relative size has changed, according to the detection result from the detection device, and when the changed relative size is smaller than the reference size, to reduce the predetermined image, in proportion to a difference between the changed relative size and the reference size.

2. The display apparatus according to claim 1, wherein the controller causes the display device to display, as the predetermined image, an operation screen including a plurality of key images for respectively inputting different instructions.

3. The display apparatus according to claim 1, wherein the controller causes the display device to display a part of the predetermined image, in the display region.

4. The display apparatus according to claim 1, wherein a detection region of the detection device extends in a direction perpendicular to the display region of the display device.

5. An image forming apparatus comprising:
  the display apparatus according to claim 1; and
  an image forming device that forms an image on a recording medium.

* * * * *